United States Patent
Gasparakis (10) Patent No.: US 12,056,352 B2
(45) Date of Patent: Aug. 6, 2024

(54) MEMORY CONTROL FOR DATA PROCESSING PIPELINE OPTIMIZATION

(71) Applicant: Advanced Micro Devices, Inc., Santa Clara, CA (US)

(72) Inventor: Harris Eleftherios Gasparakis, Nashua, NH (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 53 days.

(21) Appl. No.: 17/955,286

(22) Filed: Sep. 28, 2022

(65) Prior Publication Data

US 2024/0103719 A1    Mar. 28, 2024

(51) Int. Cl.
*G06F 3/06* (2006.01)

(52) U.S. Cl.
CPC .......... *G06F 3/0604* (2013.01); *G06F 3/0655* (2013.01); *G06F 3/0679* (2013.01)

(58) Field of Classification Search
CPC ..... G06F 3/0604; G06F 3/0655; G06F 3/0679
USPC .................................................. 717/151–157
See application file for complete search history.

(56) References Cited

U.S. PATENT DOCUMENTS

| | | | | |
|---|---|---|---|---|
| 5,276,824 A * | 1/1994 | Skruhak | ............. | G06F 9/30145 713/320 |
| 9,772,886 B2 * | 9/2017 | Cherkasova | ......... | G06F 9/5066 |
| 10,733,794 B2 * | 8/2020 | He | ......................... | G06T 15/80 |
| 10,970,189 B2 * | 4/2021 | Shukla | ................... | G06F 16/254 |
| 11,500,673 B2 * | 11/2022 | Taher | ...................... | G06F 9/485 |
| 11,544,136 B1 * | 1/2023 | Pekel | ..................... | G06N 20/00 |

OTHER PUBLICATIONS

Olukotun et al., "Perfommnce Optimization of Pipelined Primary Caches", 1992, ACM, pp. 181-190. (Year: 1992).*
Quemy, "Data Pipeline Selection and Optimization", 2019, Published in the Workshop Proceedings of the EDBT/ICDT, 5 pages. (Year: 2019).*
Zhao et al., "CODA: Improving Resource Utilization by Slimming and Co-locating DNN and CPU Jobs", 2020, IEEE, pp. 853-863. (Year: 2020).*

* cited by examiner

*Primary Examiner* — Ted T. Vo
(74) *Attorney, Agent, or Firm* — FIG. 1 Patents (57) ABSTRACT

Generating optimization instructions for data processing pipelines is described. A pipeline optimization system computes resource usage information that describes memory and compute usage metrics during execution of each stage of the data processing pipeline. The system additionally generates data storage information that describes how data output by each pipeline stage is utilized by other stages of the pipeline. The pipeline optimization system then generates the optimization instructions to control how memory operations are performed for a specific data processing pipeline during execution. In implementations, the optimization instructions cause a memory system to discard data (e.g., invalidate cache entries) without copying the discarded data to another storage location after the data is no longer needed by the pipeline. The optimization instructions alternatively or additionally control at least one of evicting, writing-back, or prefetching data to minimize latency during pipeline execution.

20 Claims, 5 Drawing Sheets

MEMORY CONTROL FOR DATA PROCESSING PIPELINE OPTIMIZATION

BACKGROUND

Computer technology is regularly advancing, resulting in faster and more powerful computers. One area of advancement is data processing pipelines that perform computationally intensive operations to achieve objectives such as image classification, graphics rendering, and so forth. As more complex data processing pipelines are developed, the amount of data generated by various pipeline stages similarly increases. As a corollary, expansive memory systems are leveraged to maintain data for subsequent access during pipeline execution.

BRIEF DESCRIPTION OF THE DRAWINGS

The detailed description is described with reference to the accompanying figures.

DETAILED DESCRIPTION

Overview

With advances in computing device technology, data processing pipelines (e.g., algorithmic pipelines, machine learning pipelines, and so forth) are mechanisms increasingly used for a variety of data processing tasks. For instance, data computation and graphics processing pipelines are executed by various computing hardware components, such as GPUS, CPUS, FPGAS, and so forth, to achieve designated objectives. Individual pipelines perform their respective data processing using a sequence of executable units of code (e.g., layers, compute kernels, shaders, etc.), which each process input data to generate output data. The output data generated by one pipeline layer is often used by one or more other layers in the pipeline. Likewise, the input data consumed by one pipeline layer often includes output data generated by a different layer in the pipeline. Large pipelines that include numerous layers often employ "skip connections," which means that data output by one layer is not consumed by another layer until much later in the pipeline sequence.

In an effort to mitigate data loading latency (e.g., a duration required for one layer to obtain input data from a data source), conventional pipeline designs implement caches for storing data (e.g., storing data output by one layer for access and retrieval by another layer later in the pipeline). Caches are advantageous from a data latency standpoint relative to main memory of a processing device implementing the pipeline due to the design of many data retrieval algorithms. For instance, many data retrieval algorithms are designed to first search for data in a lowest cache (e.g., cache one) before proceeding to search in higher caches (e.g., cache two, then cache three, and so forth), and ultimately search in main memory if data cannot be found in cache. Searching each cache is performed over a plurality of clock cycles, thus it is advantageous from a latency standpoint to maintain data that will be subsequently used by a pipeline layer in a lowest cache (e.g., a cache or data storage location first considered by a data retrieval algorithm). However, caches are limited in their storage capabilities. Consequently, in conventional pipeline architectures, when cache storage is unavailable (e.g., when a cache is full), at least a portion of data stored in a cache is evicted and "written-back" to a higher cache or main memory, thereby making room for new data for storage in the cache.

A primary drawback facing conventional pipeline architectures is that conventional cache hardware is not configurable for a specific pipeline design or computational objective. Rather, conventional caches treat data and pipeline operations equally, which often results in wasting computational resources and inducing undue delay due to caches performing unnecessary operations. For instance, in many implementations caches evict and write-back data to main memory when the data being written back is not going to be used later in the pipeline sequence of operations. The additional time and processing resources required to unnecessarily write-back the data results in non-deterministic stalls and increased power consumption, thus producing a suboptimal pipeline architecture.

To address these conventional shortcomings, a pipeline optimization system generates optimization instructions that are tailored for a particular data processing pipeline. The pipeline optimization system, for instance, analyzes execution of a data processing pipeline and identifies a computational load (e.g., an available processor device capacity) and a memory load (e.g., a transaction volume between a processor device and data storage) required to execute each stage of the data processing pipeline. The pipeline optimization system further determines how output data generated by one stage of the pipeline is used as input data by one or more subsequent stages of the pipeline. The pipeline optimization system, for instance, identifies whether the pipeline includes any skip-level connections between stages and determines whether a data storage capacity is adequate to maintain data required by intermediary stages as well as data that will be required by later ones of the skip-level-connected stages.

Based on information describing the computational and memory loads associated with each pipeline stage, as well as information describing how data output by each pipeline stage is used by other pipeline stages, the pipeline optimization system generates the optimization instructions to control memory operations performed during execution of the pipeline in a manner that minimizes latency and resource consumption for a processor executing the pipeline. The optimization instructions prevent continued storage of data output by one pipeline stage after it is no longer needed for input to any subsequent pipeline stage. In this way, operation of a processing device that executes the pipeline, as well as a data storage system that maintains data generated by stages of the pipeline, is optimized based on the specific workload involved in executing the pipeline. A variety of other examples are also contemplated, further discussion of which is included in the following discussion and shown using corresponding figures.

In some aspects, the techniques described herein relate to a method including computing, for each of a plurality of stages of a data processing pipeline, resource usage information that describes a memory usage and a compute usage of the data processing pipeline stage, generating data storage information that describes, for each of the plurality of stages of the data processing pipeline, whether data output by the data processing pipeline stage is processed as input data by another one of the plurality of stages of the data processing pipeline, and generating optimization instructions for the data processing pipeline based on the resource usage information and the data storage information, the optimization instructions including an instruction that causes data output by a first one of the plurality of stages to be discarded from memory after the data output by the first one of the plurality of stages is input to a second one of the plurality of stages.

In some aspects, the techniques described herein relate to a method, wherein the data processing pipeline is a machine learning pipeline and each of the plurality of stages is a layer of the machine learning pipeline.

In some aspects, the techniques described herein relate to a method, wherein the data processing pipeline is an algorithm and each of the plurality of stages is a compute kernel or a shader of the algorithm.

In some aspects, the techniques described herein relate to a method, wherein the data processing pipeline is being executed by at least one processor and the compute usage for each of the plurality of stages of the data processing pipeline is a percentage value specifying an available processing capacity of the at least one processor during the data processing pipeline stage.

In some aspects, the techniques described herein relate to a method, wherein the data processing pipeline is being executed by at least one processor and involves the at least one processor obtaining data from one or more memory locations, wherein the memory usage for each of the plurality of stages of the data processing pipeline describes a transaction volume between the at least one processor and the one or more memory locations during the data processing pipeline stage.

In some aspects, the techniques described herein relate to a method, wherein computing the memory usage and the compute usage for each of the plurality of stages of the data processing pipeline includes executing a first instance of the data processing pipeline using a processor, monitoring an available processing capacity of the processor for each of the plurality of stages during the executing the first instance of the data processing pipeline, monitoring a transaction volume between the processor and a memory location that occurs during each of the plurality of stages during the executing the first instance of the data processing pipeline, and executing a second instance of the data processing pipeline that occurs after executing the first instance of the data processing pipeline based on the optimization instructions.

In some aspects, the techniques described herein relate to a method, wherein computing the resource usage information for at least one of the plurality of stages of the data processing pipeline is performed based on user input specifying at least one of the memory usage or the compute usage for the at least one of the plurality of stages of the data processing pipeline.

In some aspects, the techniques described herein relate to a method, wherein generating the data storage information for at least one of the plurality of stages of the data processing pipeline is performed based on user input specifying one or more other ones of the plurality of stages of the data processing pipeline that process data output by the at least one of the plurality of stages of the data processing pipeline as input data.

In some aspects, the techniques described herein relate to a method, wherein the data storage information specifies, for at least one of the plurality of stages of the data processing pipeline one or more other ones of the plurality of stages of the data processing pipeline that process data output by the at least one of the plurality of stages of the data processing pipeline as input data, a sequence position for each of the one or more other ones of the plurality of stages of the data processing pipeline, and a size of the data output by the at least one of the plurality of stages of the data processing pipeline.

In some aspects, the techniques described herein relate to a method, wherein the optimization instructions further include an instruction that causes data output by the second one of the plurality of stages to be evicted from a first memory location and written to a second memory location in response to detecting that the data output by the second one of the plurality of stages is used as input data for a third one of the plurality of stages and a threshold duration separates the second one of the plurality of stages and the third one of the plurality of stages during execution of the data processing pipeline.

In some aspects, the techniques described herein relate to a method, wherein the first memory location is prioritized for search by a data retrieval procedure of a processor implementing the data processing pipeline over the second memory location.

In some aspects, the techniques described herein relate to a method, wherein the optimization instructions further include an instruction that causes the data output by the second one of the plurality of stages to be retrieved from the second memory location at a time that occurs before executing the third one of the plurality of stages of the data processing pipeline.

In some aspects, the techniques described herein relate to a method, wherein the time that occurs before executing the third one of the plurality of stages of the data processing pipeline corresponds to one of the plurality of stages of the data processing pipeline having associated resource usage information indicating that the memory usage of the data processing pipeline stage does not satisfy a memory usage threshold.

In some aspects, the techniques described herein relate to a method, wherein the time that occurs before executing the third one of the plurality of stages of the data processing pipeline corresponds to one of the plurality of stages of the data processing pipeline having associated resource usage information indicating that the compute usage of the data processing pipeline stage satisfies a compute usage threshold.

In some aspects, the techniques described herein relate to a method, wherein the instruction that causes data output by the first one of the plurality of stages to be discarded from memory after the data output by the first one of the plurality of stages is input to the second one of the plurality of stages instructs the data output by the first one of the plurality of stages to be maintained in memory until accessed by a threshold number of the plurality of stages, wherein the second one of the plurality of stages comprises a least one of the threshold number of the plurality of the plurality of stages during execution of the data processing pipeline.

In some aspects, the techniques described herein relate to a method including executing a first instance of a data processing pipeline that includes a plurality of stages, each of the plurality of stages generating output data by processing input data according to one or more instructions, storing the output data generated by each of the plurality of stages in a memory location receiving optimization instructions for the data processing pipeline, and executing a second instance of the data processing pipeline according to the optimization instructions by causing data output by at least one of the plurality of stages to be discarded from the memory location following a final retrieval of the data output by the at least one of the plurality of stages from the memory location by at least one other one of the plurality of stages.

In some aspects, the techniques described herein relate to a method, wherein executing the first instance of the data processing pipeline is performed over a first duration and executing the second instance of the data processing pipeline is performed over a second duration, wherein the first duration is longer than the second duration.

In some aspects, the techniques described herein relate to a method, wherein the optimization instructions are generated by monitoring a communication link between the memory location and a processor executing the data processing pipeline during execution of the first instance of the data processing pipeline and identifying when the data output by the at least one of the plurality of stages is retrieved from the memory location for use as the input data to the at least one other one of the plurality of stages.

In some aspects, the techniques described herein relate to a method, wherein the optimization instructions cause the data output by the at least one of the plurality of stages to be discarded from the memory location independent of copying the data output by the at least one of the plurality of stages to another memory location.

In some aspects, the techniques described herein relate to a system including a first processor configured to compute, for each of a plurality of stages of a data processing pipeline, resource usage information that describes a memory usage and a compute usage of the data processing pipeline stage, generate data storage information that describes, for each of the plurality of stages of the data processing pipeline, whether data output by the data processing pipeline stage is processed as input data by another one of the plurality of stages of the data processing pipeline, and generate optimization instructions for the data processing pipeline based on the resource usage information and the data storage information, the optimization instructions including an instruction that causes data output by a first one of the plurality of stages to be discarded from memory after the data output by the first one of the plurality of stages is input to a second one of the plurality of stages, and a second processor configured to execute the data processing pipeline by communicating with at least one memory location based on the optimization instructions.

Figure 1:
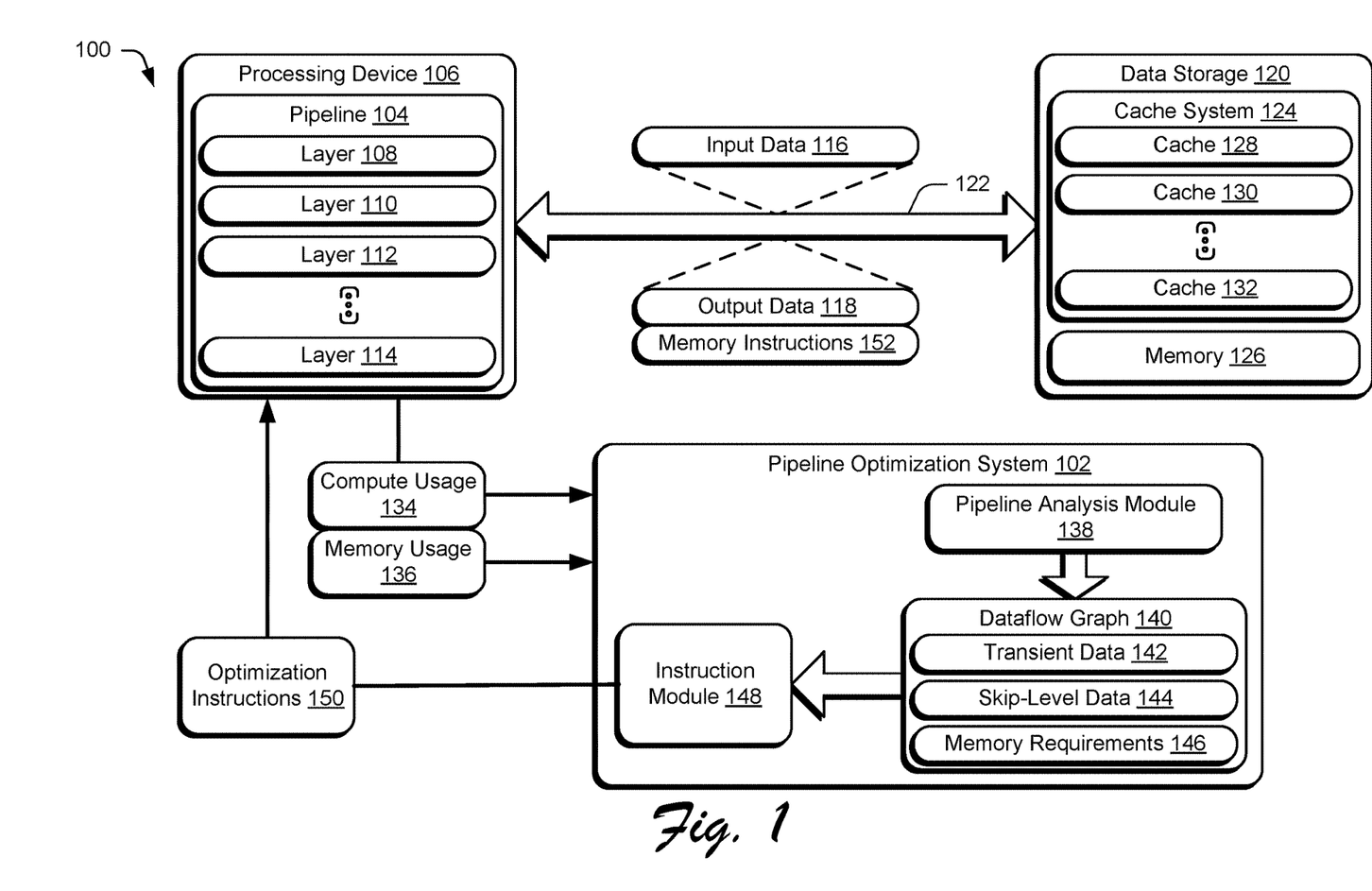
FIG. 1 is a block diagram of an example pipeline optimization system configured to generate optimization instructions that control memory operations performed as part of executing a data processing pipeline.

FIG. 1 is a block diagram of an example system 100 that is operable to employ the techniques described herein. Specifically, in the illustrated example of FIG. 1, the system 100 includes a pipeline optimization system 102 that is configured to generate optimization instructions for a data processing pipeline, such as for pipeline 104 being executed by processing device 106. As described herein, a data processing pipeline refers to a multistep workflow where discrete steps are performed by different stages of the data processing pipeline. As such, individual stages of a data processing pipeline process input data according to one or more instructions defined for the individual pipeline stage to produce output data. In this manner, each stage of the pipeline 104 is representative of one or more units of instruction that are executable by the processing device 106 (e.g., compute kernels, convolutional kernels, shaders, and so forth).

Output data generated by one pipeline stage is then useable by one or more other stages in the pipeline to produce further output data, and so forth. For instance, the pipeline 104 is illustrated as including a plurality of layers (e.g., layer 108, layer 110, layer 112, and layer 114), where each layer represents a discrete stage of the pipeline 104. In accordance with the techniques described herein, the pipeline 104 is representative of a pipeline that includes any number of stages, as represented by the ellipses separating layer 112 and layer 114. In this manner, the pipeline 104 is representative of any data processing pipeline configured for execution by a processing device 106, such as an algorithmic pipeline, a machine learning pipeline, and so forth.

As an example, in one or more implementations the pipeline 104 is configured as a machine learning pipeline tasked with an image classification objective. In this image classification objective example, data representing an image is provided as input to an initial stage (e.g., a first stage) of the pipeline 104 and a final stage (e.g., a sequentially last stage) of the pipeline 104 generates a segmentation map that classifies one or more regions of the input image based on content (e.g., identifiable objects) depicted in the image. Intermediary stages of the pipeline 104 process data output by one or more preceding stages, such that discrete stages of the pipeline 104 perform different tasks (e.g., down sampling, up sampling, convolutional filtering, cropping, etc.) that collectively achieve the image classification objective. Although described with respect to an image classification objective for context, the pipeline 104 is not so limited and is representative of a data processing pipeline that is configured for a range of different objectives.

For instance, in some implementations the pipeline 104 is configured as having an architecture similar to that of the convolutional network architecture described in U-Net: Convolutional Networks for Biomedical Image Segmentation by Ronneberger, et. al, which employs large skip connections between different pipeline layers. Alternatively or additionally, the pipeline 104 is representative of a network that employs one or more residual blocks that implement skip connections of relatively smaller ranges. For instance, in some implementations the pipeline 104 is a deep learning model such as a Generative Pre-Training (GPT) model such as GPT-2 or GPT-3, a Bidirectional Encoder Representations from Transformers (BERT) model, or the like, configured with a language representation objective. In such example implementations where the pipeline 104 is a deep learning model, transformer blocks include at least one residual block in the attention portion and the fully connected portion of the model architecture. In some implementations, the pipeline 104 is representative of a machine learning model during training. For instance, in some implementations the pipeline 104 is a neural network being trained using backpropagation, where data calculated by one layer of the pipeline during a forward pass is retrieved by another layer (e.g., during gradient descent) to determine an error function, such that a skip connection exists between the different layers of the pipeline. Thus, the pipeline 104 is representative of a range of different data processing pipelines having different architectures and implemented for different objectives.

The processing device 106 is representative of a device configured to execute the pipeline 104, such as a processor (e.g., graphics processing unit or central processing unit), disk array controllers, hard disk drive host adapters, memory cards, solid-state drives, wireless communications hardware connections, Ethernet hardware connections, switches, bridges, network interface controllers, and so forth. In one or more implementations, the system 100 is implemented in software. For example, the system 100 part of an operating system of a computing device or software of a computing device component configured to execute the pipeline 104. Additionally or alternatively, the system 100 is implemented in hardware. For example, the system 100 is implemented in an integrated circuit of a computing device component configured to execute the pipeline 104, such as an integrated circuit of a peripheral connect interface (PCI) bus.

Thus, the system 100 is implementable in a smartphone or other wireless phone, a tablet or phablet computer, a notebook computer (e.g., netbook or ultrabook), a laptop computer, a wearable device (e.g., a smartwatch, an augmented reality headset or device, a virtual reality headset or device), an entertainment device (e.g., a gaming console, a portable gaming device, a streaming media player, a digital video recorder, a music or other audio playback device, a television), an Internet of Things (IoT) device, an automotive computer, and so forth.

The processing device 106 is configured to execute the pipeline 104 by providing input data 116 to an initial stage of the pipeline 104 (e.g., layer 108) and processing the input data 116 using the instructions encoded in the initial stage of the pipeline 104. By processing the input data 116 using instructions encoded in the initial stage of the pipeline 104, the processing device 106 causes the initial stage to generate output data 118. Output data 118 is then communicated by the processing device 106 to data storage 120 for maintenance and subsequent access, such that the output data 118 generated by an initial stage of the processing device 106 is available for retrieval from the data storage 120 as input data 116 for one or more subsequent stages of the pipeline 104.

The processing device 106 is configured to obtain input data 116 from, and communicate output data 118 to, data storage 120 via a communication link 122. In implementations, the communication link 122 is bi-directional, such that the processing device 106 transmits a request for input data 116 (e.g., together with or independent of output data 118) to the data storage 120 and the data storage 120 transmits the requested input data 116 to the processing device 106 for processing by the pipeline 104. Alternatively, in some implementations the communication link 122 facilitates data transmission in a single direction, (e.g., transmission of input data 116 from the data storage 120 to the processing device 106; or transmission of output data 118 and/or a request for input data 116 from the processing device 106 to the data storage 120).

In implementations where the data storage 120 facilitates data transmission in a single direction, the system 100 further includes one or more additional communication links (not depicted) communicatively coupling the processing device 106 and the data storage 120. In at least one implementation where the data storage 120 facilitates transmission of data from the processing device 106 for receipt by the data storage 120, for instance, an additional communication link facilitates transmission of data in an opposite direction (e.g., from the data storage 120 for receipt by the processing device 106).

The communication link 122 is representative of a variety of different communication mechanisms that interface the processing device 106 and the data storage 120. For instance, in one or more implementations the communication link 122 is configured as a Peripheral Component Interconnect Express (PCIe) connection between the processing device 106 and the data storage 120. Alternatively or additionally, the communication link 122 is configured as a Compute Express Link (CXL), an inter-chip Global Memory Interconnect (xGMT), an NVLink, and so forth, between the processing device 106 and the data storage 120. In some implementations, the communication link 122 represents a wireless communication link between the processing device 106 and the data storage 120, such as a Near Field Communication (NFC) link, a Bluetooth link, a Wi-Fi link, and the like. In this manner, the communication link 122 is representative of any wired communication link, wireless communication link, or combination thereof, that communicatively couples the processing device 106 and the data storage 120.

Via the communicative coupling provided by the communication link 122, the data storage 120 is configured to manage requests for data, such as requests for input data 116 from the processing device 106, requests from another entity to transmit data to the processing device 106 (e.g., requests from a central processing unit to transmit input data 116 to the processing device 106 when the processing device 106 is configured as a graphics processing unit), or combinations thereof. For instance, the data storage 120 receives requests for input data 116 from a variety of sources, such as a hard disk, a network card, a processing device component linked to the system 100 via a universal serial bus (USB), a graphics card, a CXL device, an accelerator, and so forth.

In the illustrated example of FIG. 1, the data storage 120 is depicted as including a cache system 124 and memory 126. The cache system 124 is representative of a hardware component, a software component, or a combination thereof, configured to store data so that requests for data (e.g., requests for input data 116) can be served faster if the requested data is stored in cache, relative to a scenario where the requested data is stored in memory 126. For instance, in some implementations the cache system 124 is configured with multiple different memory locations (e.g., cache 128, cache 130, and cache 132) that are organized in a hierarchal manner, such that upon receiving a request for data (e.g., input data 116), the data storage 120 begins by searching a first prioritized memory location (e.g., cache 128), before proceeding to search in subsequently prioritized memory locations of the cache system 124 (e.g., cache 130 and cache 132), and finally searching one or more memory locations external to the cache system 124 (e.g., memory 126).

Although illustrated as being implemented in data storage 120 and remote from the processing device 106, in some implementations the cache system 124 is implemented locally on the processing device 106. In this manner, the cache system 124 is representative of a graphics processing unit cache, a central processing unit cache, a digital signal processor cache, an in-network cache, a disk cache, a web cache, a cache implemented in cloud storage, and so forth). Further, although illustrated in the example system 100 as including three distinct memory locations (e.g., cache 128, cache 130, and cache 132), the cache system 124 is representative of any one or more memory locations, as indicated by the ellipses separating cache 130 and cache 132.

In implementations, the cache system 124 has a limited data storage capability, such that it is not able to store all the input data 116 that will be used by each stage of the pipeline 104 (e.g., initial input data 116 provided to the pipeline 104 and output data 118 produced by individual stages of the pipeline 104). Consequently, the cache system 124 is configured to periodically evict data to make room for additional data storage (e.g., to make room for storing output data 118 as it is generated by the pipeline 104). For instance, in response to a memory location that is first prioritized for search (e.g., by a searching algorithm implemented by the cache system 124) being full or approaching data storage capacity, the cache system 124 copies (e.g., writes-back) data to a memory location that is prioritized for subsequent search and discards (e.g., invalidates) data stored in the memory location first prioritized for search.

For instance, the cache system 124 writes-back data stored in cache 128 to cache 130 and invalidates the corresponding data entries in cache 128, thereby making room for additional data to be stored in cache 128. In some implementations the cache system 124 continues this process of evicting and writing-back data from memory locations that are prioritized for search to other memory locations that are prioritized for subsequent search until evicting and writing-back data from the cache system 124 to memory 126. Absent memory instructions received from the processing device 106 that control how memory operations are performed, which are generated by the pipeline optimization system 102 and described in further detail below, the cache system 124 performs data eviction according to a default data management scheme for the cache system 124.

For instance, in some implementations the cache system 124 is configured to evict data on a First In First Out (FIFO) basis, where the cache system 124 evicts data that was first accessed by the processing device 106 without respect as to how often or how many times the data was previously accessed. Alternatively or additionally, the cache system 124 is configured evict data on a Last In First Out (LIFO) basis, where the cache system 124 evicts data that was most recently accessed by the processing device 106 without respect as to how often or how many times the data was previously accessed. Alternatively or additionally, the cache system 124 is configured to evict data based on a Least Recently Used (LRU) basis, where data that was accessed least recently by the processing device 106 is evicted. Alternatively or additionally, the cache system 124 is configured to discard data on a Most Recently Used (MRU) basis, where data that was most recently accessed by the processing device 106 is evicted. Alternatively or additionally, the cache system 124 is configured to discard data on a random basis, such that data is randomly selected and evicted to make space as necessary.

Regardless of an eviction scheme, the cache system 124 is configured by default to evict (e.g., write-back and invalidate) data from a higher search-priority cache to a lower search-priority cache until the cache system 124 has no more available storage, at which point data is evicted to memory 126. The memory 126 is representative of any suitable data storage location that is separate from the cache system 124, such as physical memory (e.g., DRAM, Flash memory, PCM, and so forth), a hard disk, a network card, a graphics card, a CXL device, a hardware accelerator, and so forth.

This default eviction scheme is problematic and results in a suboptimal execution of the pipeline 104 due to various reasons, such as eviction and persistent storage of output data 118 that is not subsequently used as input data 116 by the pipeline 104. Such unnecessary eviction forces eviction of other output data 118 that will be subsequently used as input data 116 during execution of the pipeline 104, which results in additional clock cycles to iteratively progress through the hierarchy of memory locations and introduces latency. The pipeline optimization system 102 is thus configured to ascertain information describing how the pipeline 104 is executed by the processing device 106 and generate optimization instructions that control memory operations performed by the processing device 106 during execution of the pipeline 104 to mitigate these drawbacks facing conventional pipeline execution systems.

To do so, the pipeline optimization system 102 is configured to determine a compute usage 134 and a memory usage 136 for each stage of the pipeline 104. As described herein, the compute usage 134 refers to a computational load of the processing device 106 during execution of a corresponding stage of the pipeline 104. For instance, the compute usage 134 for layer 108 indicates a percentage value specifying an available processing capacity of the processing device 106 during execution of the layer 108. The compute usage 134 is determined by the pipeline optimization system 102 using any suitable means.

For instance, in some implementations the compute usage 134 is specified by user input (e.g., input from a developer that specifies a computational load for each stage of the pipeline 104). Alternatively or additionally, the compute usage 134 is determined by analyzing the instructions to be executed by the pipeline stage (e.g., instructions executed by layer 108 when processing input data 116 to generate output data 118) and computing a computational load required to execute the instructions. As an example, in an implementation where the layer 108 is a convolutional kernel with x channels and y filters, the compute usage 134 is determined by multiplying the number of channels by the number of filters associated with the convolutional kernel. Alternatively or additionally, the compute usage 134 is determined by monitoring a computational load (e.g., an available processing capacity) of the processing device 106 while executing an instance of the pipeline 104 (e.g., while the processing device 106 is executing the pipeline 104 to output a segmentation map that classifies an input image).

The memory usage 136 describes, for each stage of the pipeline 104, a transaction volume (e.g., data size), transaction rate between the processing device 106 and the data storage 120, or combinations thereof, during execution of the pipeline stage. The memory usage 136 is determined by the pipeline optimization system 102 using any suitable means.

For instance, in some implementations the memory usage 136 is determined by analyzing a time between a request for input data 116 from the processing device 106 to the data storage 120 and receipt of the input data 116 by the processing device 106 during execution of an instance of the pipeline 104. Alternatively or additionally, the memory usage 136 is determined by monitoring cache hit rates of the cache system 124 when the processing device 106 requests input data 116 during execution of the pipeline 104 stage. Alternatively or additionally, the memory usage 136 is determined by identifying a size of input data 116 required for execution of the pipeline stage, a size of output data 118 generated as a result of executing the pipeline stage, or combinations thereof. In some implementations, the memory usage 136 is specified by user input (e.g., input form a developer that describes a size of input data 116 provided to a pipeline stage, a size of output data 118 generated by the pipeline stage, or combinations thereof.

The pipeline optimization system 102 then provides the compute usage 134 and the memory usage 136 for each stage of the pipeline 104 to a pipeline analysis module 138, which is configured to generate a dataflow graph 140 that describes execution of the pipeline 104. The dataflow graph 140 includes information specifying transient data 142, which corresponds to output data 118 generated by a stage of the pipeline 104 that is used as input data 116 for only one other pipeline stage, such that the transient data can be discarded from a memory location (e.g., evicted from the cache system 124 without being written-back) after access by the processing device 106 for the one other pipeline stage. The dataflow graph 140 further includes information specifying skip-level data 144, which corresponds to output data 118 generated by a stage of the pipeline 104 that is used as input data 116 for two or more other pipeline stages (e.g., output data 118 generated by layer 108 that is used as input data 116 for layer 110 as well as layer 114).

Additionally, the dataflow graph 140 includes information describing memory requirements 146 for each instance of transient data 142 and each instance of skip-level data 144, such that the pipeline optimization system 102 is aware of a data size for each instance of input data 116 required to execute the pipeline 104, as well as a time during execution of the pipeline 104 at which the corresponding instance of input data 116 is needed. In some implementations, the memory requirements 146 further specify available data storage capacities, such as an individual data storage capacity of each cache in the cache system 124 and a data storage capacity of the memory 126.

Information described by the dataflow graph 140, together with information describing the compute usage 134 and the memory usage 136 for each stage of the pipeline 104, is then provided to an instruction module 148. The instruction module 148 is configured to generate optimization instructions 150 for the pipeline 104. The optimization instructions 150 control memory operations performed by the processing device 106 and/or the data storage 120 during execution of the pipeline 104, in a manner that is tailored to the specific compute usage 134 and memory usage 136 of each stage in the particular pipeline 104.

For instance, in some implementations the optimization instructions 150 include an instruction that causes output data 118 generated by one of the pipeline 104 stages to be discarded from memory (e.g., invalidated from a cache in the cache system 124 without being written-back to a different cache or memory 126) after the output data 118 is provided as input data 116 to a different stage of the pipeline 104. For instance, in an implementation where the dataflow graph 140 indicates that pipeline 104 execution generates transient data 142, the optimization instructions 150 include an instruction to discard each instance of transient data 142 from data storage 120 after the transient data 142 is provided as input to an appropriate pipeline stage.

Alternatively or additionally, the optimization instructions 150 include an instruction that causes output data 118 generated by one of the pipeline 104 stages to be evicted from a first memory location (e.g., cache 128) and written to a second memory location (e.g., cache 130, cache 132, or memory 126) in response to detecting that the output data 118 is used as input data 116 for another one of the pipeline 104 stages. For instance, in some implementations the instruction module 148 identifies that output data 118 generated by a first pipeline stage is used as input to a second pipeline stage as well as a $500^{th}$ pipeline stage.

In response to determining that a threshold duration separates the second and $500^{th}$ pipeline stages, determining that the memory requirements 146 preclude maintaining the output data 118 generated by the first pipeline stage while execution of the pipeline 104 proceeds from the second pipeline stage to the $500^{th}$ pipeline stage, or combinations thereof, the instruction module 148 generates an optimization instruction to evict and write-back the output data 118 generated by the first pipeline stage until pipeline execution approaches the $500^{th}$ stage, thereby freeing data storage in the cache system 124 for other data that will be used more recently by the pipeline 104.

The optimization instructions 150 are alternatively or additionally configured to include an instruction that causes the processing device 106 to retrieve data from a memory location at a specified time during execution of the pipeline 104. For instance, continuing the previous example where output data 118 generated by a first pipeline stage is used as input data 116 for second and $500^{th}$ stages of the pipeline, the instruction module 148 generates optimization instructions 150 to cause the data storage 120 to retrieve the output data 118 generated by the first pipeline stage from a memory location to which the data was evicted (e.g., memory 126) and place the retrieved output data 118 in a memory location that is accessed first by a data search algorithm (e.g., cache 128). In this manner, the optimization instructions 150 control a manner in which data is stored at various memory locations of data storage 120, in anticipation of a future need or lack thereof by the processing device 106 during execution of the pipeline 104.

Given the compute usage 134 and memory usage 136 information for each stage of the pipeline 104, the instruction module 148 is configured to generate optimization instructions 150 for execution at optimal pipeline stages. For instance, the instruction module 148 is configured to identify when certain pipeline stages involve memory-intensive operations (e.g., receiving data from, or transmitting data to, the data storage 120) as well as when certain pipeline stages involve computationally intensive operations (e.g., when the processing device 106 is executing instructions without transmitting or receiving data via the communication link 122). Consequently, the instruction module 148 is configured to generate the optimization instructions 150 to favor performance of memory operations during pipeline stages that involve computationally intensive operations rather than memory-intensive operations, thereby reducing a load imparted on the data storage 120 during execution of the pipeline 104.

The optimization instructions 150 are executed by the processing device 106 in a manner that causes the processing device 106 to communicate memory instructions 152 to the data storage 120 during execution of the pipeline 104. In some implementations, the optimization instructions 150 are encoded in the pipeline 104 (e.g., individual optimization instructions 150 are encoded in instructions for corresponding ones of the pipeline stages, such as instructions for layer 108, instructions for layer 110, and so forth). The memory instructions 152 are representative of a variety of different instruction formats and are implemented based on respective configurations of the processing device 106 and the data storage 120.

For instance, in some implementations the memory instructions 152 are configured as instruction set architecture (ISA) instructions that trigger various memory controls (e.g., data invalidation without write-back, data invalidation with write-back, data prefetching, and so forth). Alternatively or additionally, the memory instructions 152 are configured as virtual memory ISA instructions that trigger various memory controls. In some implementations, the optimization instructions 150 are output by the instruction module 148 as attribute decorators for use by higher-level languages (e.g., C++) and converted by a compiler of the processing device 106 to ISA instructions for executing the pipeline 104. Alternatively or additionally, the optimization instructions 150 are configured for execution by a processing device 106 other than a processing device 106 executing the pipeline 104. For instance, in an example implementation where a central processing unit controls a graphics processing unit executing the pipeline 104, the optimization instructions 150 are executed by the central processing unit to generate and communicate memory instructions 152 to the data storage 120, cause the graphics processing unit to generate and communicate the memory instructions 152 to the data storage 120, or combinations thereof.

Advantageously, the optimization instructions 150 enable the memory instructions 152 to be associated with specific instances of output data 118. For instance, in an example implementation the memory instructions 152 for an instance of output data 118 instruct the data storage 120 to maintain the instance of output data 118 for a single access by the processing device 106 and to discard the instance of output data 118 (e.g., without writing-back to another memory location) following the single access. In another example implementation, the memory instructions 152 for an instance of output data 118 instruct the data storage 120 to maintain the instance of output data 118 for a defined number of accesses by the processing device 106 and to discard the instance of output data 118 after the defined number of accesses, and otherwise maintain the instance of output data 118. Having considered an example system that is operable to generate and employ optimization instructions for executing a data processing pipeline, consider now an example pipeline for which optimization instructions are generated.

Figure 2:
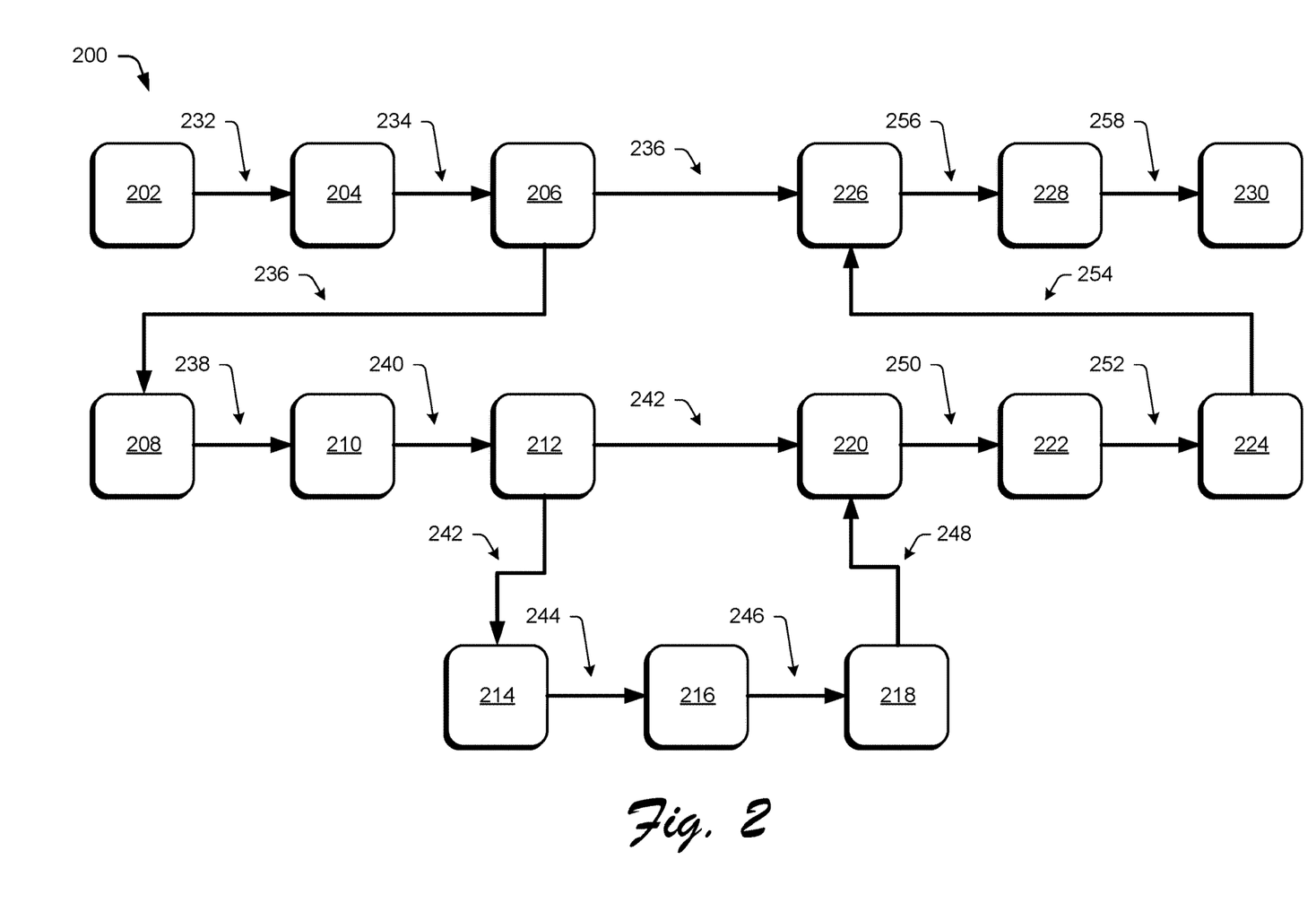
FIG. 2 illustrates an example of a data processing pipeline for which the pipeline optimization system of FIG. 1 generates optimization instructions.

FIG. 2 illustrates an example 200 of a pipeline 104 for which the pipeline optimization system 102 generates optimization instructions 150. In the illustrated example 200, the pipeline 104 includes a plurality of stages, such as stage 202, stage 204, stage 206, stage 208, stage 210, stage 212, stage 214, stage 216, stage 218, stage 210, stage 212, stage 214, stage 216, stage 218, stage 220, stage 222, stage 224, stage 226, stage 228, and stage 230. Each stage of the pipeline 104 is configured to generate output data (e.g., output data 118) by processing input data (e.g., input data 116) according to a set of instructions defined for the stage. In this manner, the stages of pipeline 104 form a sequence of operations, where data produced by one operation is provided as input to another operation.

Specifically, stage 202 outputs data 232, which in turn is input to stage 204 to generate data 234. Data 234 is input to stage 206, which generates data 236. Data 236 is input to both stage 208 and stage 226, such that data 236 represents an instance of skip-level data 144. Stage 208 generates data 238 from data 236, which is input to stage 210 to generate data 240, which is in turn input to stage 212 to generate data 242. Data 242 is input to stage 214 to generate data 244, which is processed by stage 216 to generate data 246, which is processed as input by stage 218 to generate data 248. Data 248 is processed together with data 242 as input by stage 220 to generate data 250. In this manner, data 242 represents another instance of skip-level data 144. Data 250 is processed by stage 222 to generate data 252, which is processed by stage 224 to generate data 254. Data 254 is provided as input together with data 236 to stage 226, which outputs data 256. Stage 228 processes data 256 to output data 258, which is finally processed by stage 230 to generate an output that corresponds to an objective for which the pipeline 104 is configured.

In this manner, while data 236 and data 238 represent instances of skip-level data 144, the remaining data output by various pipeline stages in the illustrated example 200 represent instances of transient data 142. Consequently, in conventional pipeline execution systems, data 236 is evicted and written-back to lower search priority memory locations during execution of the pipeline 104 to make room for storage of data 236, data 238, data 240, data 242, data 244, data 246, data 248, data 250, and data 252, despite such instances of data being unnecessary for storage upon execution of stage 226.

Figure 3:
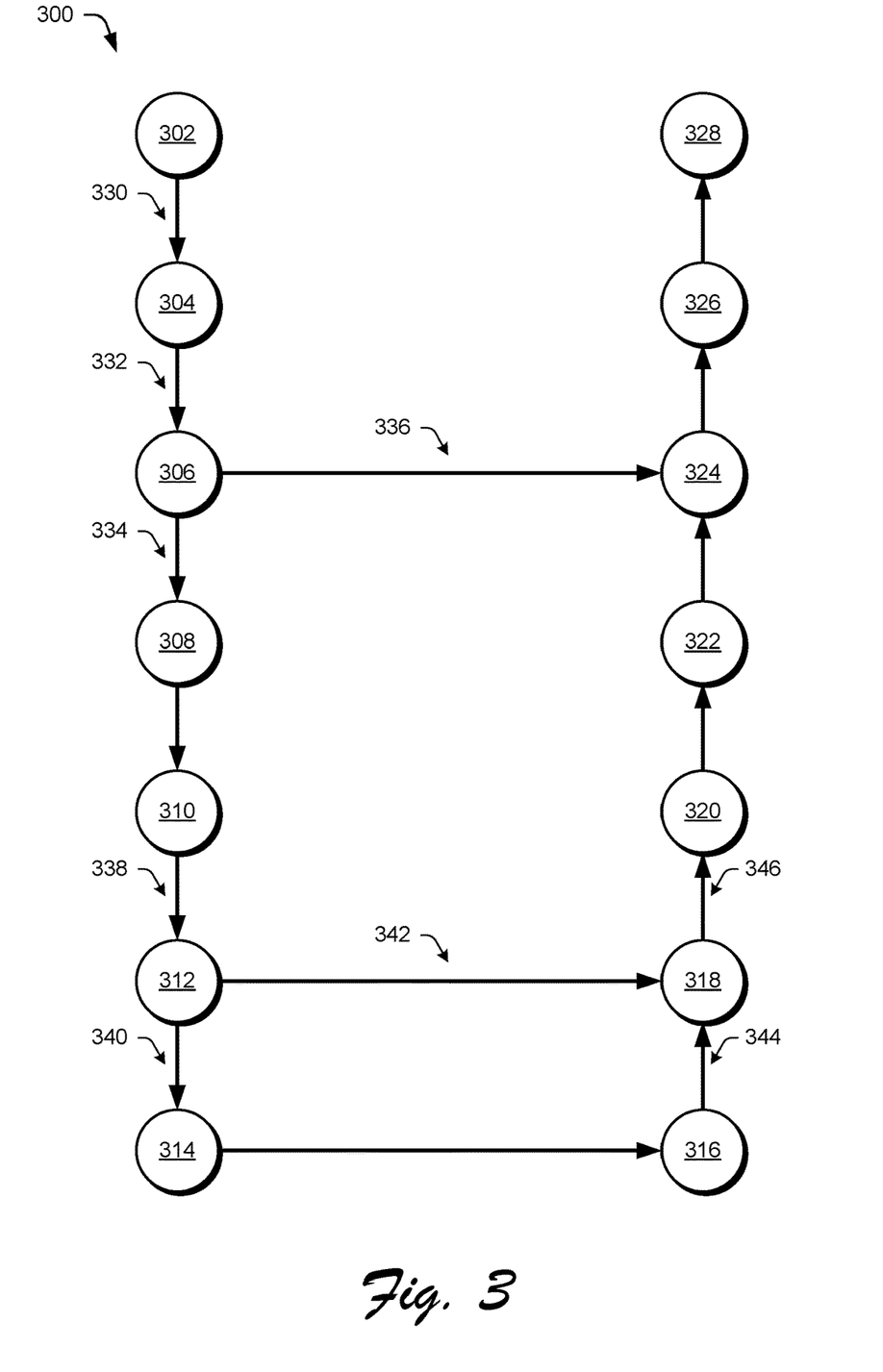
FIG. 3 illustrates an example of a dataflow graph generated by the pipeline optimization system of FIG. 1 as part of generating optimization instructions in accordance with one or more implementations.

FIG. 3 illustrates an example 300 of a dataflow graph 140 generated by the pipeline optimization system 102 as part of generating optimization instructions 150 for the example pipeline 104 illustrated in FIG. 2. Specifically, in the illustrated example 300, the dataflow graph 140 includes a plurality of nodes that each represent output data 118 generated by a stage of the pipeline 104. For instance, node 302 represents data 232, node 304 represents data 234, node 306 represents data 236, node 308 represents data 238, node 310 represents data 240, node 312 represents data 242, and node 314 represents data 244.

In a similar manner, node 316 represents data 246, node 318 represents data 248, node 320 represents data 250, node 322 represents data 252, node 324 represents data 254, node 326 represents data 256, and node 328 represents data 258. The 140//thus indicates a sequence position for each stage of a pipeline 104. Various nodes of the dataflow graph 140 are connected by edges, where individual edges represent a stage of the pipeline 104 that processes input data 116 to generate output data 118, as represented by the connected nodes. For instance, edge 330 indicates how stage 204 processes output data represented by node 302 (e.g., data 232) to generate data represented by node 304 (e.g., data 234). Edge 332 indicates how stage 206 processes data represented by node 304 (e.g., data 234) to generate data represented by node 306 (e.g., data 236). Edge 334 indicates how stage 208 processes data 236 as input data 116 and edge 336 indicates how stage 226 also processes data 236 as input data 116. In this manner, the dataflow graph 140 is useable by the instruction module 148 to readily identify skip-level data 144 involved in executing the pipeline 104, as well as the specific pipeline stages that process skip-level data 144 as input data 116 and corresponding memory requirements 146 of transient data 142 as well as skip-level data 144.

For instance, given the dataflow graph 140, the instruction module 148 readily identifies skip-level data 144 as represented by nodes having two or more edges that are directed away from the node and connect the node to another node. For instance, in the illustrated example 300, node 312 is depicted as being connected to node 310, node 314, and node 318 by edge 338, edge 340, and edge 342, respectively. Because edge 340 and edge 342 are directed away from node 312, the instruction module 148 identifies data represented by node 312 (e.g., data 242) as an instance of skip-level data 144.

The instruction module 148 further identifies transient data 142 as represented by nodes having only one edge directed away from the node and connecting the node to another node. For instance, in the illustrated example 300, node 318 is depicted as being connected to node 312, node 316, and node 320 by edge 342, edge 344, and edge 346, respectively. However, because only edge 346 is directed away from node 318, the instruction module 148 identifies data represented by node 318 (e.g., data 248) as an instance of transient data 142.

For each node representing transient data 142, the instruction module 148 is configured to generate optimization instructions 150 that cause the data storage 120 to discard the represented data (e.g., invalidate from the cache system 124 independent of writing to another storage location) after a single access by the processing device 106 during execution of the pipeline 104. For each node representing skip-level data 144, the instruction module 148 is configured to generate optimization instructions 150 that account for memory requirements 146 of pipeline stages that occur between sequentially first and last stages connected by the skip-level data 144.

As an example, given the dataflow graph 140 in the illustrated example 300, the instruction module 148 identifies that the data represented by node 306 (e.g., data 236) is skip-level data 144 that is processed as input data by both stage 208 and stage 226. In order to generate an optimization instruction for handling the data 236 in a manner that minimizes latency and computational resource consumption during execution of the pipeline 104, the instruction module 148 identifies memory requirements 146 associated with maintaining output data 118 generated by each pipeline stage in between stage 208 and stage 226. Specifically, the instruction module 148 determines a requisite data storage size and duration required to store each of data 236, data 238, data 240, data 242, data 244, data 246, data 248, data 250, data 252, and data 254. In this manner, the memory requirements 146 inform the instruction module 148 as to data storage requirements that will be demanded of the data storage 120 during execution of the pipeline 104 before data 236 is again needed for input to stage 226.

Consider an example implementation where the memory requirements 146 indicate that an available capacity of the cache system 124 (e.g., an available capacity of one or more of the cache 128, the cache 130, or the cache 132) will be exceeded during execution of the pipeline 104 between stage 206 and stage 226. In this example implementation, the instruction module 148 generates the optimization instructions 150 to cause the data storage 120 to evict the data 236 from the cache system 124 and write-back the data 236 to a lower search priority memory location (e.g., memory 126). Continuing this example implementation, the instruction module 148 generates the optimization instructions 150 to cause the data storage 120 to fetch the data 236 from the lower search priority memory location to a higher search priority memory location (e.g., cache 128) before execution of the pipeline 104 reaches stage 226.

Further, because the pipeline optimization system 102 is informed of the compute usage 134 and memory usage 136 of each pipeline stage, the optimization instructions 150 are generated to perform the evict and write-back and pre-fetch operations at optimal times during execution of the pipeline 104. For instance, the pipeline optimization system 102 identifies that executing stage 212 is computationally intensive and imparts a minimal load on the data storage 120. In accordance with one or more implementations, the pipeline optimization system 102 identifies that the memory usage 136 of stage 212 does not satisfy a memory usage threshold (e.g., a minimum measure of memory usage).

Alternatively or additionally, the pipeline optimization system 102 identifies that the compute usage 134 of stage 212 satisfies a compute usage threshold (e.g., a minimum measure of available processing device 106 capacity). By identifying that the stage 212 does not satisfy a memory usage threshold, satisfies a compute usage threshold, or combinations thereof, the pipeline optimization system 102 determines that transmitting data between the processing device 106 and the data storage 120 will minimize latency and computational resources required to do so. Thus, the instruction module 148 generates the instruction to evict and write-back data 236 from the cache system 124 to the memory 126 during execution of stage 212, thereby freeing additional space in the cache system 124 for data storage during execution of pipeline stages following stage 212.

Continuing this example, the pipeline optimization system 102 identifies that executing stage 220 is computationally intensive, and that the memory requirements 146 of stage 220, stage 222, and stage 224 enable storage of data 236 in the cache system 124 without exceeding a capacity of the cache system 124. Thus, the instruction module 148 generates the optimization instructions 150 to prefetch the data 236 from the memory 126 to the cache system 124 during execution of stage 220, such that upon execution of stage 226 retrieving data 236 from data storage 120 is performed with reduced latency.

The optimization instructions 150 are thus tailored for a specific pipeline 104 and enable a processing device 106 executing the pipeline 104 to reduce latency and computational resources involved in executing the pipeline 104, even when output data 118 is maintained in a conventional data storage 120 designed with default cache eviction policies. For instance, using the techniques described herein, the processing device 106 executes pipeline 104 over a first duration when performed independent of the optimization instructions 150. The processing device 106 executes the pipeline 104 over a second duration when performed with the optimization instructions 150, where the first duration is longer than the second duration.

Figure 4:
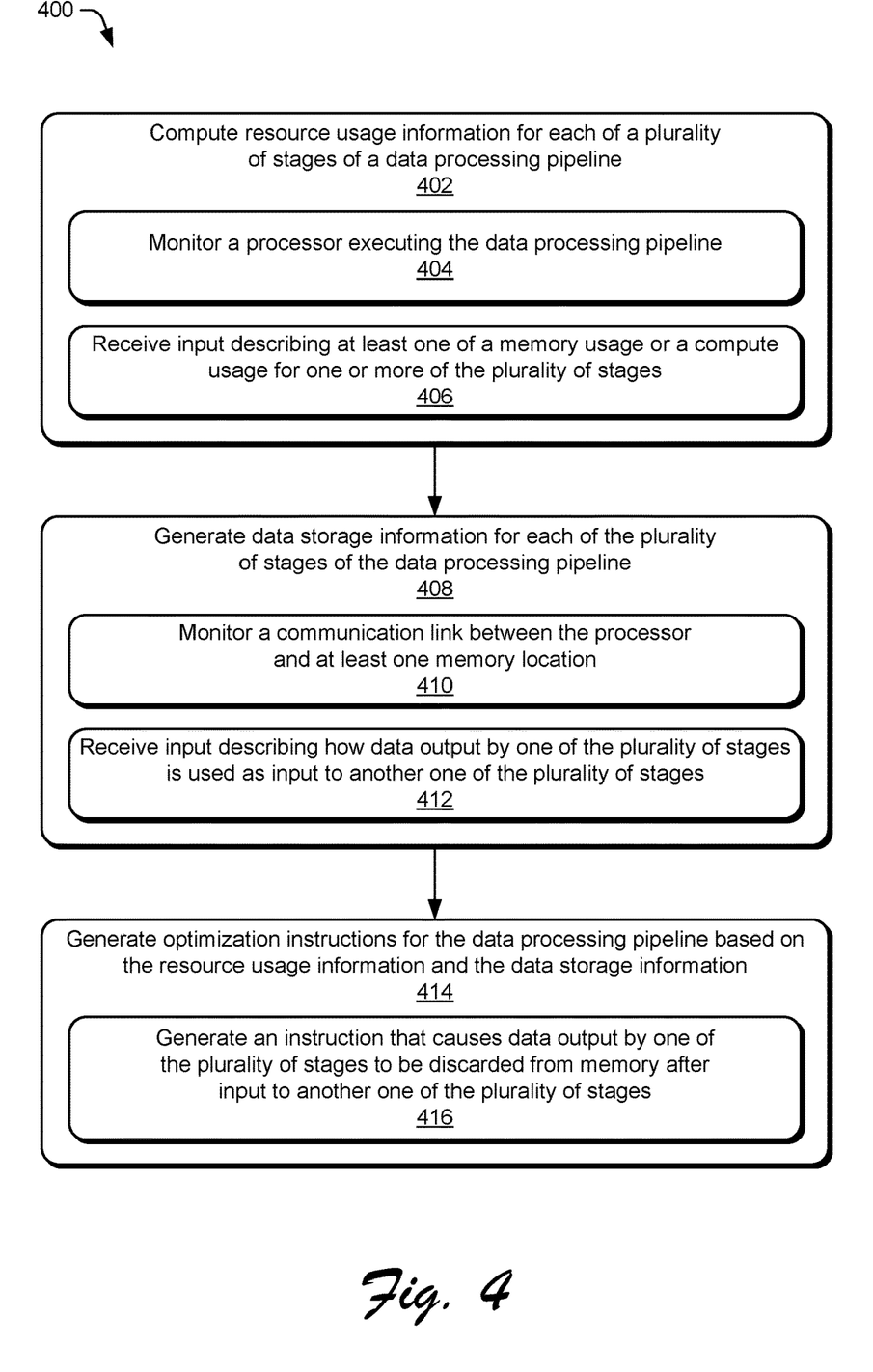
FIG. 4 is a flow diagram depicting a procedure in an example implementation of generating optimization instructions for a data processing pipeline in accordance with the techniques described herein.

FIG. 4 depicts a procedure 400 in an example implementation of generating optimization instructions for a data processing pipeline in accordance with the techniques described herein. Resource usage information for each of a plurality of stages of a data processing pipeline is computed (block 402). The pipeline optimization system 102, for instance, computes a compute usage 134 and a memory usage 136 associated with executing each stage (e.g., each of layer 108, layer 110, layer 112, and layer 114) of the pipeline 104.

As part of computing resource usage information for each stage of the data processing pipeline, a processor executing the data processing pipeline is monitored (block 404). The pipeline optimization system 102, for instance, monitors the processing device 106 during execution of a first instance of the pipeline 104 before generating the optimization instructions 150 for use during execution of a second instance of the pipeline 104. Alternatively or additionally, input describing at least one of a memory usage or a compute usage for one or more of the plurality of stages is received as part of computing resource usage information (block 406). The pipeline optimization system 102, for instance, receives user input specifying at least a portion of the compute usage 134 or the memory usage 136 for one or more stages of the pipeline 104.

Data storage information is generated for each of the plurality of stages of the data processing pipeline (block 408). The pipeline optimization system 102, for instance, determines a data storage size and a data storage duration required for each instance of output data 118 generated during execution of the pipeline 104. As part of generating data storage information, a communication link between the processor executing the pipeline and at least one memory location is monitored (block 410). The pipeline optimization system 102, for instance, monitors communication link 122 to determine a data size and a duration associated with storing each instance of output data 118 (e.g., a duration between when output data 118 is transmitted to data storage 120 and returned one or more times as input data 116 to the processing device 106).

Alternatively or additionally, input describing how data output by one of the plurality of stages is used as input to another one of the plurality of stages is received as part of generating data storage information (block 412). The pipeline optimization system 102, for instance, receives user input specifying how output data 118 generated by at least one pipeline 104 stage is used as input by another stage of the pipeline 104, how many times the output data 118 is used as input by other stages of the pipeline 104, sequential positions of pipeline stages that use output data 118 as input data 116, a size of output data 118, combinations thereof, and so forth.

Optimization instructions for the data processing pipeline are generated based on the resource usage information and the data storage information (block 414). The instruction module 148, for instance, generates optimization instructions 150 based on information included in the dataflow graph 140 as well as information describing a compute usage 134 and a memory usage 136 associated with each stage of the pipeline 104. As part of generating the optimization instructions, an instruction that causes data output by one of the plurality of stages to be discarded from memory after input to another one of the plurality of stages is generated (block 416). The instruction module 148, for instance, generates the optimization instructions 150 to include an instruction that causes the data storage 120 to discard an instance of transient data 142 (e.g., invalidate a cache location storing the transient data 142 without writing-back the invalidated data to another memory location) in response to the transient data 142 being accessed by the processing device 106.

Figure 5:
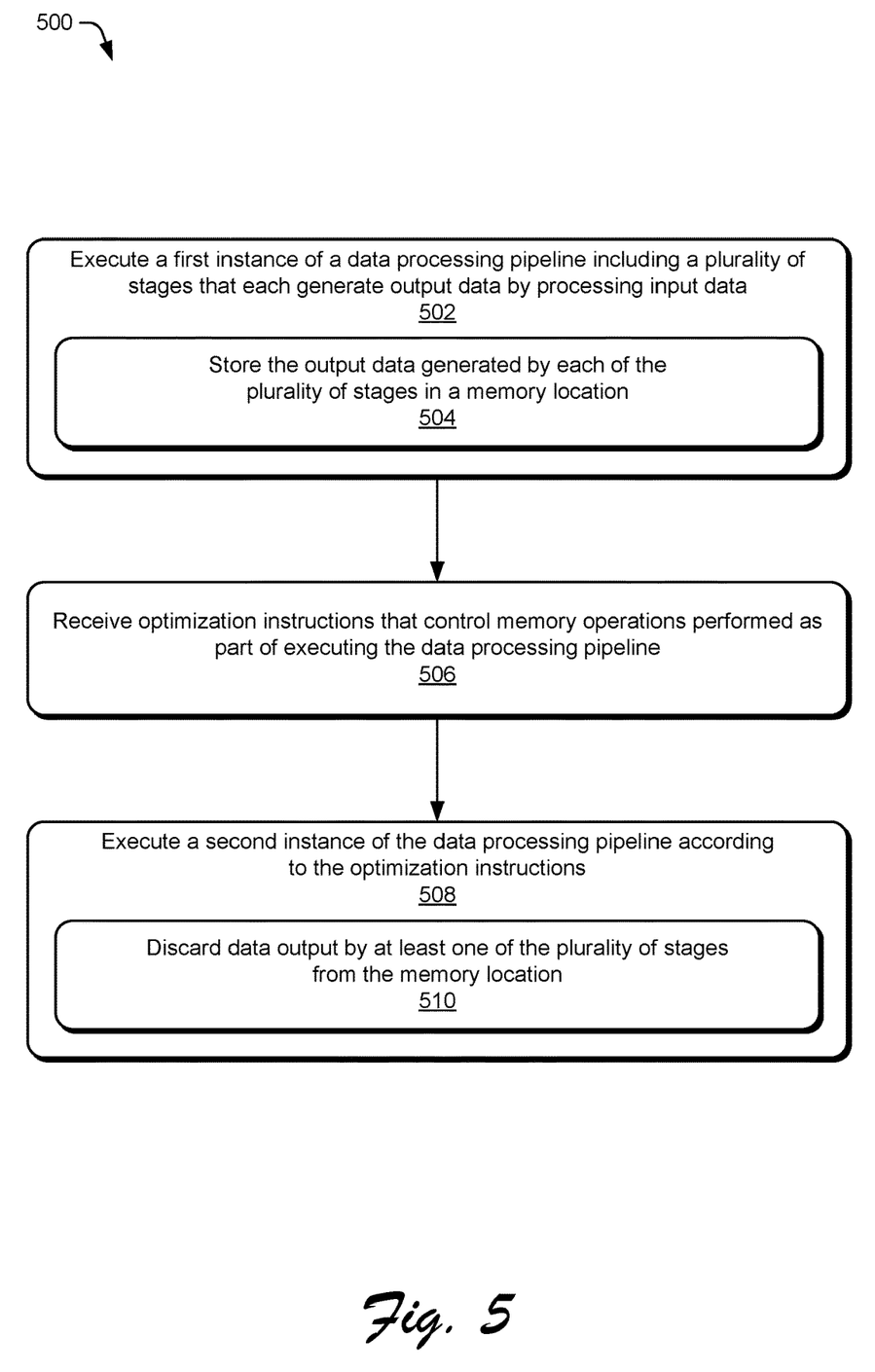
FIG. 5 is a flow diagram depicting a procedure in an example implementation of executing a data processing pipeline based on optimization instructions generated in accordance with the techniques described herein.

FIG. 5 depicts a procedure 500 in an example implementation of executing a data processing pipeline based on optimization instructions generated in accordance with the techniques described herein. A first instance of a data processing pipeline including a plurality of stages that each generate output data by processing input data is executed (block 502). A first instance of the pipeline 104 that includes layer 108, layer 110, layer 112, and layer 114, which are each configured to generate output data 118 by processing input data 116, is executed.

As part of executing the first instance of the data processing pipeline, output data generated by each of the plurality of stages is stored in a memory location (block 504). The output data 118 generated by each stage of the pipeline 104, for instance, is communicated by the processing device 106 to data storage 120 and maintained in data storage 120 for a duration of executing the first instance of the pipeline 104. Optimization instructions that control memory operations performed as part of executing the data processing pipeline are then received (block 506). The processing device 106, for instance, receives optimization instructions 150 from the pipeline optimization system 102.

A second instance of the data processing pipeline is executed according to the optimization instructions (block 508). The processing device 106, for instance, executes the pipeline 104 according to the optimization instructions 150. As part of executing the second instance of the data processing pipeline, data output by at least one of the plurality of stages is discarded from the memory location (block 510). The processing device 106, for instance, communicates one or more memory instructions 152 to the data storage 120 that causes the data storage 120 to discard at least one instance of output data 118 (e.g., invalidate one or more cache entries without copying the one or more cache entries to another memory location) after the at least one instance of output data 118 is no longer needed as input data 116 for a subsequent stage of the pipeline 104.

Although features and elements are described above in particular combinations, each feature or element is usable alone without the other features and elements or in various combinations with or without other features and elements. In this manner, many variations are possible based on the disclosure herein.

The various functional units illustrated in the figures and/or described herein (including, where appropriate, the pipeline optimization system 102, the pipeline 104, the processing device 106, the data storage 120, the cache system 124, the memory 126, and the communication link 122) are implemented in any of a variety of different manners such as hardware circuitry, software or firmware executing on a programmable processor, or any combination of two or more of hardware, software, and firmware. The methods provided are implemented in any of a variety of devices, such as a general-purpose computer, a processor, or a processor core. Suitable processors include, by way of example, a general purpose processor, a special purpose processor, a conventional processor, a digital signal processor (DSP), a graphics processing unit (GPU), a parallel accelerated processor, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

In one or more implementations, the methods and procedures provided herein are implemented in a computer program, software, or firmware incorporated in a non-transitory computer-readable storage medium for execution by a general-purpose computer or a processor. Examples of non-transitory computer-readable storage mediums include a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs).

Conclusion

Although the systems and techniques have been described in language specific to structural features and/or methodological acts, it is to be understood that the systems and techniques defined in the appended claims are not necessarily limited to the specific features or acts described. Rather, the specific features and acts are disclosed as example forms of implementing the claimed subject matter.

What is claimed is:

1. A method comprising:
    computing, for each of a plurality of stages of a data processing pipeline, resource usage information that describes a memory usage and a compute usage of the data processing pipeline stage;
    generating data storage information that describes, for each of the plurality of stages of the data processing pipeline, whether data output by the data processing pipeline stage is processed as input data by another one of the plurality of stages of the data processing pipeline; and
    generating optimization instructions for the data processing pipeline based on the resource usage information and the data storage information, the optimization instructions including an instruction that causes data output by a first one of the plurality of stages to be discarded from memory after the data output by the first one of the plurality of stages is input to a second one of the plurality of stages.

2. The method of claim 1, wherein the data processing pipeline comprises a machine learning pipeline and each of the plurality of stages comprises a layer of the machine learning pipeline.

3. The method of claim 1, wherein the data processing pipeline comprises an algorithm and each of the plurality of stages comprises a compute kernel or a shader of the algorithm.

4. The method of claim 1, wherein the data processing pipeline is being executed by at least one processor and the compute usage for each of the plurality of stages of the data processing pipeline is a percentage value specifying an available processing capacity of the at least one processor during the data processing pipeline stage.

5. The method of claim 1, wherein the data processing pipeline is being executed by at least one processor and involves the at least one processor obtaining data from one or more memory locations, wherein the memory usage for each of the plurality of stages of the data processing pipeline describes a transaction volume between the at least one processor and the one or more memory locations during the data processing pipeline stage.

6. The method of claim 1, wherein computing the memory usage and the compute usage for each of the plurality of stages of the data processing pipeline comprises:
   executing a first instance of the data processing pipeline using a processor;
   monitoring an available processing capacity of the processor for each of the plurality of stages during the executing the first instance of the data processing pipeline;
   monitoring a transaction volume between the processor and a memory location that occurs during each of the plurality of stages during the executing the first instance of the data processing pipeline; and
   executing a second instance of the data processing pipeline that occurs after executing the first instance of the data processing pipeline based on the optimization instructions.

7. The method of claim 1, wherein computing the resource usage information for at least one of the plurality of stages of the data processing pipeline is performed based on user input specifying at least one of the memory usage or the compute usage for the at least one of the plurality of stages of the data processing pipeline.

8. The method of claim 1, wherein generating the data storage information for at least one of the plurality of stages of the data processing pipeline is performed based on user input specifying one or more other ones of the plurality of stages of the data processing pipeline that process data output by the at least one of the plurality of stages of the data processing pipeline as input data.

9. The method of claim 1, wherein the data storage information specifies, for at least one of the plurality of stages of the data processing pipeline:
   one or more other ones of the plurality of stages of the data processing pipeline that process data output by the at least one of the plurality of stages of the data processing pipeline as input data;
   a sequence position for each of the one or more other ones of the plurality of stages of the data processing pipeline; and
   a size of the data output by the at least one of the plurality of stages of the data processing pipeline.

10. The method of claim 1, wherein the optimization instructions further include an instruction that causes data output by the second one of the plurality of stages to be evicted from a first memory location and written to a second memory location in response to detecting that the data output by the second one of the plurality of stages is used as input data for a third one of the plurality of stages and a threshold duration separates the second one of the plurality of stages and the third one of the plurality of stages during execution of the data processing pipeline.

11. The method of claim 10, wherein the first memory location is prioritized for search by a data retrieval procedure of a processor implementing the data processing pipeline over the second memory location.

12. The method of claim 10, wherein the optimization instructions further include an instruction that causes the data output by the second one of the plurality of stages to be retrieved from the second memory location at a time that occurs before executing the third one of the plurality of stages of the data processing pipeline.

13. The method of claim 12, wherein the time that occurs before executing the third one of the plurality of stages of the data processing pipeline corresponds to one of the plurality of stages of the data processing pipeline having associated resource usage information indicating that the memory usage of the data processing pipeline stage does not satisfy a memory usage threshold.

14. The method of claim 12, wherein the time that occurs before executing the third one of the plurality of stages of the data processing pipeline corresponds to one of the plurality of stages of the data processing pipeline having associated resource usage information indicating that the compute usage of the data processing pipeline stage satisfies a compute usage threshold.

15. The method of claim 1, wherein the instruction that causes data output by the first one of the plurality of stages to be discarded from memory after the data output by the first one of the plurality of stages is input to the second one of the plurality of stages instructs the data output by the first one of the plurality of stages to be maintained in memory until accessed by a threshold number of the plurality of stages, wherein the second one of the plurality of stages comprises a least one of the threshold number of the plurality of stages during execution of the data processing pipeline.

16. A method comprising:
   executing a first instance of a data processing pipeline that includes a plurality of stages, each of the plurality of stages generating output data by processing input data according to one or more instructions;
   storing the output data generated by each of the plurality of stages in a memory location;
   receiving optimization instructions for the data processing pipeline; and
   executing a second instance of the data processing pipeline according to the optimization instructions by causing data output by at least one of the plurality of stages to be discarded from the memory location following a final retrieval of the data output by the at least one of the plurality of stages from the memory location by at least one other one of the plurality of stages.

17. The method of claim 16, wherein executing the first instance of the data processing pipeline is performed over a first duration and executing the second instance of the data processing pipeline is performed over a second duration, wherein the first duration is longer than the second duration.

18. The method of claim 16, wherein the optimization instructions are generated by monitoring a communication link between the memory location and a processor executing the data processing pipeline during execution of the first instance of the data processing pipeline and identifying when the data output by the at least one of the plurality of stages is retrieved from the memory location for use as the input data to the at least one other one of the plurality of stages.

19. The method of claim 16, wherein the optimization instructions cause the data output by the at least one of the plurality of stages to be discarded from the memory location independent of copying the data output by the at least one of the plurality of stages to another memory location.

20. A system comprising:
   a first processor configured to:
      compute, for each of a plurality of stages of a data processing pipeline, resource usage information that describes a memory usage and a compute usage of the data processing pipeline stage;
      generate data storage information that describes, for each of the plurality of stages of the data processing pipeline, whether data output by the data processing pipeline stage is processed as input data by another one of the plurality of stages of the data processing pipeline; and
      generate optimization instructions for the data processing pipeline based on the resource usage information and the data storage information, the optimization instructions including an instruction that causes data output by a first one of the plurality of stages to be discarded from memory after the data output by the first one of the plurality of stages is input to a second one of the plurality of stages; and
   a second processor configured to execute the data processing pipeline by communicating with at least one memory location based on the optimization instructions.

* * * * *